April 9, 1929.   M. L. HARTMANN ET AL   1,708,572
DETECTOR
Filed Feb. 21, 1925
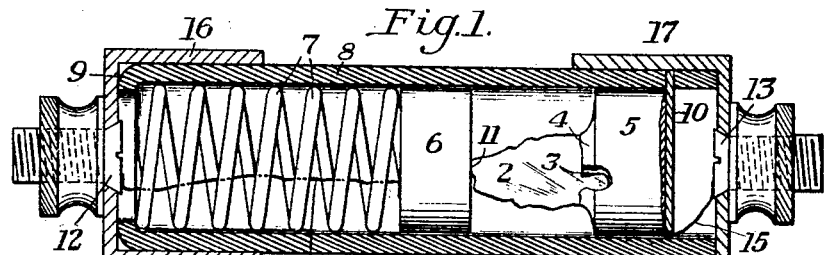
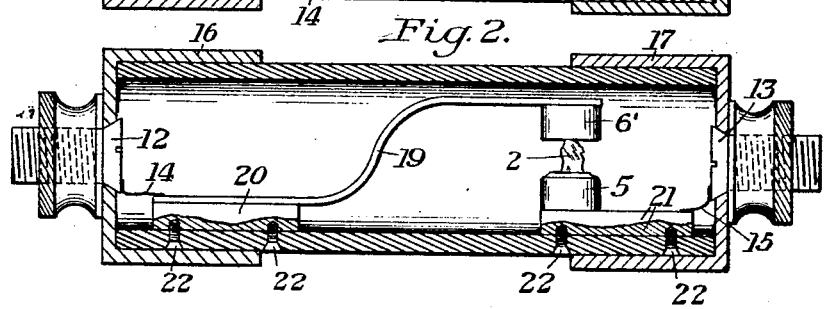
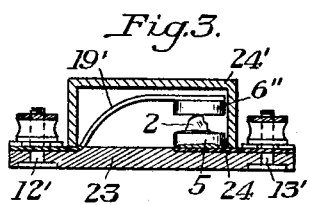
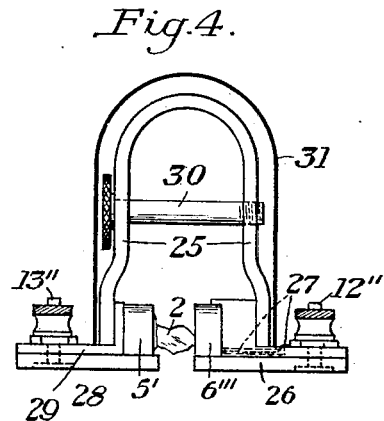
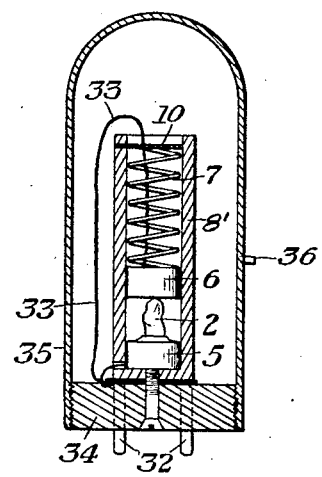
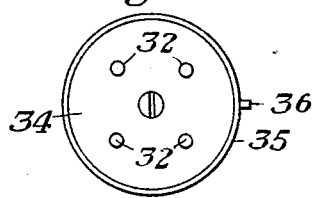
INVENTORS Patented Apr. 9, 1929.

1,708,572

UNITED STATES PATENT OFFICE.

MINER L. HARTMANN AND MORROW C. MILLER, OF NIAGARA FALLS, NEW YORK, ASSIGNORS TO THE CARBORUNDUM COMPANY, OF NIAGARA FALLS, NEW YORK, A CORPORATION OF PENNSYLVANIA.

DETECTOR.

Application filed February 21, 1925. Serial No. 10,795.

The present invention relates to an improvement in detectors for high frequency electrical oscillations, such as those used in wireless or radio telephony and telegraphy. It has long been known that the material carborundum, which is the commercial form of silicon carbide, under certain conditions acts as a detector or rectifier for high frequency electrical oscillations. Its use in the past for this purpose has been much restricted because of the uncertainty of the same results from one commercial specimen to another, and because of sensitive adjustment required in the contacting material to insure maximum sensitiveness as a detector. In addition to these defects it has heretofore been necessary to use across the carborundum detector an auxiliary source of direct current of closely regulated low voltage in order that rectification of the oscillating current would take place with maximum efficiency.

Our improvement consists in the use of high purity silicon carbide chemically treated to remove all exterior impurities, mounted in a broad area contacting base in such a way as to give minimum electrical resistance at the joint between the silicon carbide and the metallic conductor, and pressed against a hard metal plate by a very considerable pressure, of the order of magnitude of five pounds, the whole being enclosed in a protective dielectric shell. We have found that by so arranging the parts of this detector that the minimum electrical resistance results, we secure results with silicon carbide which have never before been attained in any "crystal" detector.

A detector for high frequency alternating electrical impulses is simply a rectifier, changing the alternating flow of current to direct pulsating current. In any rectifier which depends upon contact between two different materials, rectification takes place only at this contact. In the usual form, a fragment of a suitable mineral, such as galena or pyrite, is mounted in a low melting alloy and the rectifying contact is made by means of a very fine metal wire contact pressing with the lightest touch. Such "crystal" rectifiers are very widely used, particularly with the minerals galena and pyrite. This type of detector unit will very easily get out of adjustment by the slightest vibration or shock and it is with difficulty that the sensitive spots on the mineral are again found by trial with the fine wire contacting member. A sensitive spot once found will be destroyed by continued use and another similar position found by trial. We overcome this difficulty in the case of our improved silicon carbide detector by using as the contacting member a piece of polished hardened metal, preferably steel, pressed against the sensitive carborundum point by a pressure amounting to about five pounds. Under this relatively enormous pressure, there is little chance for misplacement of the sensitive contacting points and the sensitive setting once secured remains permanently. So far as it is known it is not possible to form a rectifying contact under such high pressures between any other two materials. In order to further improve this feature of fixity and permanency, we prefer to arrange the parts in a dielectric tube in such a way that their positions are in fixed and non-adjustable relation to one another.

Several embodiments of our invention are illustrated in the accompanying drawings, in which—

Figure 1 is a longitudinal sectional view of a detector having the rectifying elements enclosed in a tubular cartridge type case, the elements being pressed against each other by a coil spring.

Figure 2 is a view similar to Figure 1 in which the rectifying elements are pressed against each other by a leaf spring.

Figure 3 is a longitudinal sectional view of a detector of the type shown in Figure 2 but having the elements mounted in a slightly different manner.

Figure 4 is a sectional view of a form of detector in which a U-shaped spring is employed to press the rectifying elements against each other.

Figure 5 is a sectional view of a form of detector suitable for use in a standard vacuum tube, 4-terminal socket; and Figure 6 is a bottom plan view of the structure shown in Figure 5.

In all of the above illustrated embodiments of our invention we employ as one of the rectifying elements a silicon carbide fragment 2, preferably cleaned of surface impurities and mounted in a conducting base as described and claimed in our co-pending application, Serial No. 10,794 filed of even date herewith.

As set forth in said co-pending application, the silicon carbide fragment may be cleaned of all surface impurities by treatment, first, with a strong caustic solution, and, subsequently, by acids, as, for example, nitric acid and hydrofluoric acid. By removing the surface impurities from the silicon carbide fragment, which impurities consist usually of carbides of iron, aluminum, calcium, and silicides and oxides of these metals, a closely adhering coating 3 (Figure 1) of some highly conductive metal, such as copper or silver, preferably deposited on the silicon carbide fragment by electroplating and covering about one-half of its surface, will provide intimate electrical contact between the surface of the silicon carbide and the metallic coating, thereby greatly reducing the joint resistance between the silicon carbide fragment and the metallic conductor for carrying the current to or away from the rectifying elements. Furthermore, by removing the surface impurities from the silicon carbide fragment, the resistance of the rectifying contact is also reduced. We do not restrict our invention to the particular method herein described of cleaning the silicon carbide fragment of surface impurities, nor to electroplating the metallic coating 2, for other cleaning agents may be employed and a closely adhering conducting metal coating can be provided by other methods, as by spraying the metal on the surface of the fragment. After the first coating has been put on the fragment, a second coating 4 is put on over the first coating consisting of non-oxidizing metal, such as an alloy of tin and lead, in order to preserve the metallic film which has been deposited electrolytically or otherwise, and also to facilitate ready contact with mounting metal as described below.

After the fragment of silicon carbide has been treated and prepared as above described, it is set in an expanding alloy as, for example, solder, in a steel or metal mold so arranged and so rigid that upon cooling the metal is forced to contract around the fragment, thus providing a shaped metal base 5.

In thus effecting the solidification of the molten metal in a rigid container, the metal is squeezed into very close contact with the metal coated portion of the silicon carbide fragment, thereby producing practically perfect electrical contact. With suitable base metals and coating metals, this intimate contact causes the alloying of the metal coated silicon carbide and the base metal.

Referring to that form of our invention illustrated in Figure 1, the fragment 2 of silicon carbide, preferably treated and mounted as above described in its metal base 5, has pressed in contact therewith a hardened steel plate 6 by means of a coil spring 7. Parts 5, 6 and 7 are cylindrical in shape, and closely fit within a dielectric tube 8. One end of the tube is turned in as at 9 to provide a seat for one end of the coil spring, while a disc 10 is inserted through a slot in the tube adjacent its other end and provides a seat for the metal base 5, whereby when the parts are thus assembled, the coil spring is held under sufficient compression to press the elements 2 and 6 against each other at the point 11 with the desired pressure, say a pressure in the neighborhood of five pounds. Electrical connection between the two outside terminals 12 and 13 and the parts 2 and 5 is made by means of wires 14 and 15 welded or soldered to said terminals and parts. The terminals 12 and 13 are carried by the protective metal caps 16 and 17 at the ends of the dielectric tube.

In the form of our invention illustrated in Figure 2 we employ a leaf spring 19 to press the rectifying elements 2 and 6' against each other with the desired pressure. The metal base 5 and the leaf spring are mounted on insulating blocks 20 and 21 secured to the tube, as by screws 22. Otherwise, the construction is the same as in Figure 1.

The construction shown in Figure 3 differs only slightly from that shown in Figure 2. In this modified construction the outside terminals 12' and 13' are mounted on an insulating base 23. The leaf spring 19' has one end secured to the terminal 12', and the metal base 5 is mounted on a metal plate 24 imbedded in the upper surface of the insulating base 23 and connected with the terminal 13'. The parts are enclosed by an insulating cover 24'.

In the construction shown in Figure 4 a U-shaped spring 25 presses the hardened steel plate 6''' in contact with the silicon carbide fragment 2. The hardened steel plate 6''' is electrically insulated from the spring 25 by insulating material 26 and is connected to the terminal 12'' by wire 27. The metal base 5' is carried by insulating material 28, which latter also has the terminal 13'' mounted thereon. The terminal 13'' is connected to the base 5' by a conductor 29. An adjusting screw 30 is engaged with the spring 25 whereby the pressure between the elements 2 and 6''' can be regulated. A dielectric case 31 encloses the parts except the outside terminals.

In Figure 5 there is illustrated a form of detector suitable for use in a standard vacuum, 4-terminal socket. The base 5 is electrically connected to one of the terminals 32. The hardened steel plate 6 is electrically connected with another of the terminals 32 by wire 33. In the present audion tube base containing four terminals, only the two are connected to this rectifier corresponding to the grid and plate terminals. The terminals 32 are held in a dielectric base 34 which is screwed into the lower end of a dielectric case 35. This case carries a stud 36 which permits the insertion of this unit in the standard tube socket in a fixed position relative to the four terminal connections in the socket.

The term "surface impurities" as used herein and in the claims shall be understood to mean those impurities which form on silicon carbide in its manufacture, such as sublimed silicon, silica, iron and iron compounds, sodium and calcium salts, graphite, various silicides and carbides, and compounds of aluminum, all of which, if not removed, either increase the contact resistance of the detector unit or form a leakage path for the high-frequency currents in the nonconducting direction of the crystal.

While we have shown and described certain preferred embodiments of our invention, it will be understood that the invention is not limited to its illustrated embodiments, but may be otherwise embodied within the scope of the appended claims.

We claim:

1. A detector for high frequency electrical oscillations, comprising a cleaned fragment of silicon carbide free of surface impurities normal to silicon carbide and which form thereon in its manufacture and a hard flat metallic plate pressed in contact therewith.

2. A detector for high frequency electrical oscillations, comprising a cleaned fragment of silicon carbide free of surface impurities which form thereon in the manufacture of the silicon carbide and mounted in a conductive metal base, and a hardened substantially flat steel plate pressed in contact with said fragment.

3. A detector for high frequency electrical oscillations, comprising a fragment of silicon carbide free of surface impurities which form on the silicon carbide in the manufacture thereof and mounted in a conductive metal base, and a hardened smooth metal plate pressed in contact with said fragment with a pressure of more than one pound.

4. A detector for high frequency electrical oscillations, comprising a fragment of silicon carbide free of surface impurities and having a closely adhering coating of conducting metal over a substantial portion of its surface and having a metal base cast about the coated portion thereof, and a metallic plate pressed in contact with the uncoated portion of said fragment.

5. A detector for high frequency electrical oscillations, comprising a fragment of silicon carbide free of surface impurities and having a closely adhering coating of conducting metal over a substantial portion of its surface and having a metal base cast about the coated portion thereof, and a metallic plate pressed in contact with the uncoated portion of said fragment with a pressure of more than one pound.

In testimony whereof we have hereunto set our hands.

MINER L. HARTMANN.
MORROW C. MILLER.